(12) United States Patent
Takagi et al.

(10) Patent No.: US 11,263,759 B2
(45) Date of Patent: Mar. 1, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tsukasa Takagi, Kawasaki (JP); Minoru Kusakabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/773,698

(22) Filed: Jan. 27, 2020

(65) Prior Publication Data
US 2020/0250833 A1 Aug. 6, 2020

(30) Foreign Application Priority Data
Jan. 31, 2019 (JP) .............................. JP2019-016305

(51) Int. Cl.
*G06T 7/215* (2017.01)
*G06T 7/246* (2017.01)
(Continued)

(52) U.S. Cl.
CPC .............. *G06T 7/215* (2017.01); *G06T 5/004* (2013.01); *G06T 5/30* (2013.01); *G06T 7/246* (2017.01);
(Continued)

(58) Field of Classification Search
CPC . G06T 2207/10016; G06T 7/12; G06T 7/194; G06T 7/246; G06T 7/20;
(Continued)

(56) References Cited

U.S. PATENT DOCUMENTS 8,300,890 B1 * 10/2012 Gaikwad ............ G06K 9/00771
382/103
9,153,031 B2 * 10/2015 El-Saban ............ G06K 9/00228
(Continued)

FOREIGN PATENT DOCUMENTS

| JP | 2007-133847 A | 5/2007 |
| JP | 2017-46196 A | 3/2017 |
| JP | 2017-212647 A | 11/2017 |

OTHER PUBLICATIONS

Video Image Processing for Moving Object Detection and Segmentation using Background Subtraction (Year: 2014).*
Statistical Background Modeling: An Edge Segment based Moving Object Detection Approach (Year: 2010).*

*Primary Examiner* — Nizar N Sivji
(74) *Attorney, Agent, or Firm* — Canon U.S.A., Inc. IP Division

(57) ABSTRACT

In an image processing apparatus, a detection unit detects a moving object from a captured image captured by an image capturing unit. An extraction unit extracts an edge from the captured image. A determination unit determines, based on a position of the moving object included in the captured image, whether to superimpose the edge on a region corresponding to the moving object in a background image. A generation unit generates an output image by superimposing a mask image, for obscuring the moving object, on the region in the background image and superimposing the edge, determined by the determination unit to be superimposed, on the region in the background image.

11 Claims, 9 Drawing Sheets

(51) Int. Cl.
    *G06T 5/30*   (2006.01)
    *G06T 5/00*   (2006.01)
    *G06K 9/00*   (2006.01)
(52) U.S. Cl.
    CPC ............... *G06K 9/00221* (2013.01); *G06T 2207/30201* (2013.01)
(58) Field of Classification Search
    CPC ........... G06T 7/215; G06T 5/30; G06T 5/004; G06T 2207/30201; G06T 11/60; G06T 2207/30196; G06T 7/254; G06K 9/0061; G06K 9/00369; G06K 9/46; G06K 9/62; G06K 9/00248; G06K 9/00268; G06K 15/107; G06K 9/00221; G06K 9/00228; G06K 9/00771; G06K 9/3241
    See application file for complete search history.

(56) References Cited

U.S. PATENT DOCUMENTS

| | | | |
|---|---|---|---|
| 2004/0141636 A1* | 7/2004 | Liang | A61B 5/1128 382/110 |
| 2009/0257662 A1* | 10/2009 | Rudin | G06K 9/00771 382/218 |
| 2016/0140407 A1* | 5/2016 | Veksler | G06K 9/6215 348/77 |
| 2016/0198097 A1* | 7/2016 | Yewdall | H04N 5/272 348/659 |
| 2016/0328628 A1* | 11/2016 | Bhat | G06T 13/40 |
| 2017/0142343 A1* | 5/2017 | Kawai | H04N 5/265 |
| 2017/0257604 A1* | 9/2017 | Fujii | G06Q 30/0201 |
| 2018/0342079 A1* | 11/2018 | Yaguchi | A61B 1/00009 |
| 2019/0197313 A1* | 6/2019 | Iwanaga | G06T 7/11 |
| 2020/0057908 A1* | 2/2020 | Veksler | G06K 9/522 |

* cited by examiner

IMAGE PROCESSING APPARATUS, IMAGE PROCESSING METHOD, AND STORAGE MEDIUM

BACKGROUND

Field of the Disclosure

The present disclosure relates to an image processing technique.

Description of the Related Art

These days, monitoring systems that monitor a scene captured by an image capturing apparatuses are used. In addition, privacy protection of a person appearing in an image captured by an image capturing apparatus is becoming important.

Japanese Patent Application Laid-Open No. 2007-133847 discusses a technique that prepares a background image, obtains an outline from a captured image, and overwrites the obtained outline on the background image.

In a case where an area size of a person's face appearing in an image is small, identifying the person is difficult even if the outline of the person's face is superimposed on the background image. On the other hand, in a case where an area size of the person's face captured in an image is large, identifying the person may be possible in some cases if the outline of the person's face is superimposed on the background image.

Japanese Patent Application Laid-Open No. 2007-133847 discusses a technique that extracts a face from an image. The technique does not draw outlines of the facial features, in a case where the face area in the image is larger than or equal to a predetermined threshold value. However, accuracy of extracting a person's face from an image is low in some cases. Thus, in a case where a person's face has not been appropriately extracted from the image, the technique discussed in Japanese Patent Application Laid-Open No. 2007-133847 superimposes an outline on a person whose face area appearing in the image is large. Therefore, the technique makes it possible to identify who the person is, and thus his/her privacy cannot be protected in some cases.

SUMMARY

In order to appropriately protect privacy of a person appearing in a captured image, an image processing apparatus according to an aspect of the present disclosure includes a detection unit configured to detect a moving object from a captured image captured by an image capturing unit, an extraction unit configured to extract an edge from the captured image, a determination unit configured to determine, based on a position of the moving object included in the captured image, whether to superimpose the edge on a region corresponding to the moving object in a background image, and a generation unit configured to generate an output image by superimposing a mask image, for obscuring the moving object, on the region in the background image and superimposing the edge, determined by the determination unit to be superimposed, on the region in the background image.

Further features of the present disclosure will become apparent from the following description of exemplary embodiments with reference to the attached drawings.

DESCRIPTION OF THE EMBODIMENTS

Exemplary embodiments according to the present disclosure will be described below with reference to the attached drawings. Configurations described below in the exemplary embodiments are merely examples, and the exemplary embodiments will not be limited to the illustrated configurations.

Figure 1:
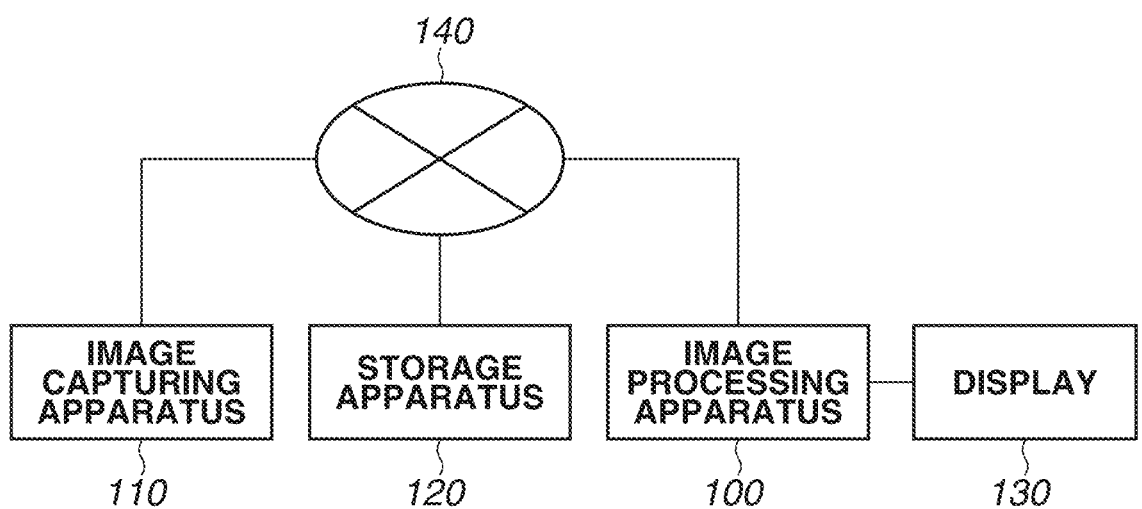
FIG. 1 illustrates a system configuration.

FIG. 1 illustrates a system configuration according to a first exemplary embodiment. A system according to the present exemplary embodiment includes an image processing apparatus 100, an image capturing apparatus 110, a storage apparatus 120, and a display 130.

The image processing apparatus 100 according to the present exemplary embodiment performs generation processing for generating an output image with respect to an image captured by the image capturing apparatus 110 as follows. The image processing apparatus 100 according to the present exemplary embodiment detects a moving object from the captured image and extracts an edge from the captured image. The image processing apparatus 100 further determines whether to superimpose the edge on a region corresponding to the moving object in a background image to which a silhouette image (a mask image) obtained by abstracting a region of the moving object based on a position of the detected moving object. Furthermore, the image processing apparatus 100 generates an image, which is obtained by superimposing the silhouette image on the background image and by superimposing the extracted edge on the region in the background image that is determined to be superimposed with the edge. Processing for generating an output image by the image processing apparatus 100 is described in detail below. The image processing apparatus 100 can be achieved by using, for example, a personal computer installed with a program for performing a function of image processing described below.

The image processing apparatus 100, the image capturing apparatus 110, and the storage apparatus 120 are connected with each other via a network 140. The network 140 includes, for example, a plurality of routers, switches, and cables in compliance with a communication standard such as ETHERNET®.

The network 140 may include the Internet, a wired local area network (LAN), a wireless LAN, and a wide area network (WAN).

The image capturing apparatus 110 is configured to capture an image. The image capturing apparatus 110 associates image data based on the captured image with identification information for identifying the image capturing apparatus 110, and transmits the image data to an external apparatus such as the image processing apparatus 100 and the storage apparatus 120 via the network 140. The system according to the present exemplary embodiment includes one image capturing apparatus 110. However, the system may include a plurality of image capturing apparatuses 110.

The storage apparatus 120 stores the image data of the captured image captured by the image capturing apparatus 110 by associating with the identification information for identifying the image capturing apparatus 110. The storage apparatus 120 transmits the stored data (e.g., the captured image, the identification information) to the image processing apparatus 100 in response to a request from the image processing apparatus 100.

The display 130 functions as a display unit, and displays, for example, the captured image captured by the image capturing apparatus 110, and a setting screen regarding image processing described below. At least any two or all of the display 130, the image processing apparatus 100, and the storage apparatus 120 may be included in a single housing.

Figure 2:
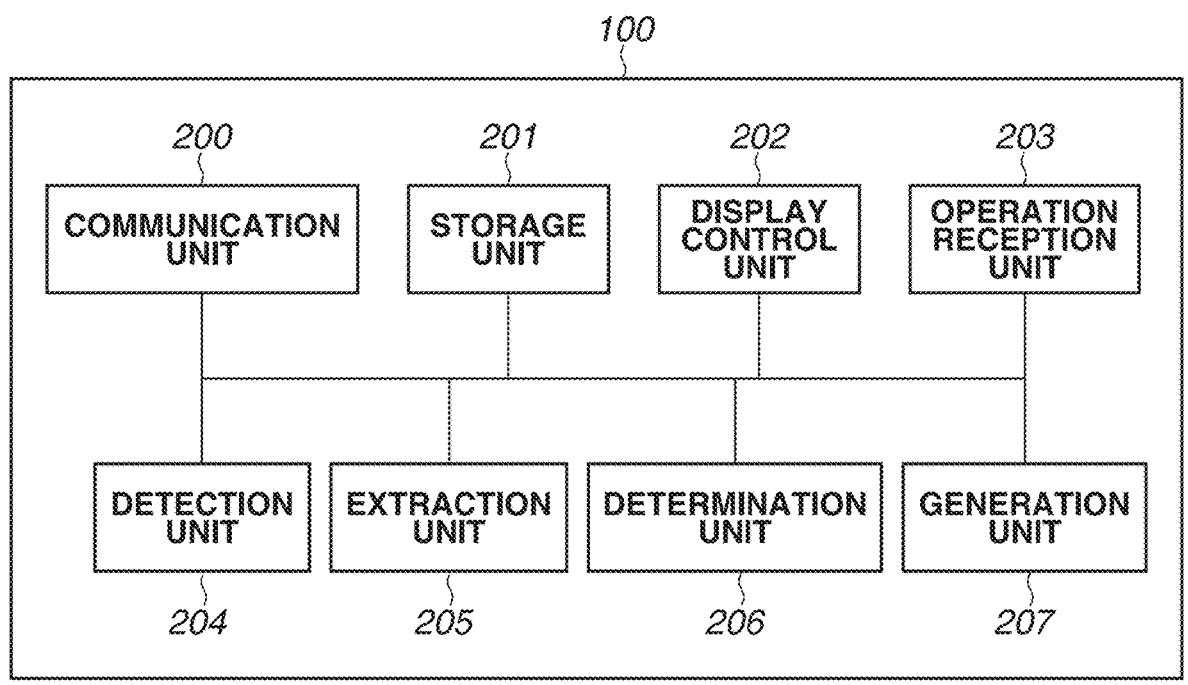
FIG. 2 illustrates function blocks included in an image processing apparatus.

Next, image processing performed by the image processing apparatus 100 according to the present exemplary embodiment is described with reference to function blocks included in the image processing apparatus 100 according to the present exemplary embodiment illustrated in FIG. 2. In a case of the present exemplary embodiment, each function illustrated in FIG. 2 is realized using a read only memory (ROM) 920 and a central processing unit (CPU) 900 illustrated in FIG. 9 in a manner described below. Each function illustrated in FIG. 2 is realized by the CPU 900 executing a computer program stored in the ROM 920. The CPU 900 and the ROM 920 are included in the image processing apparatus 100.

Figure 9:
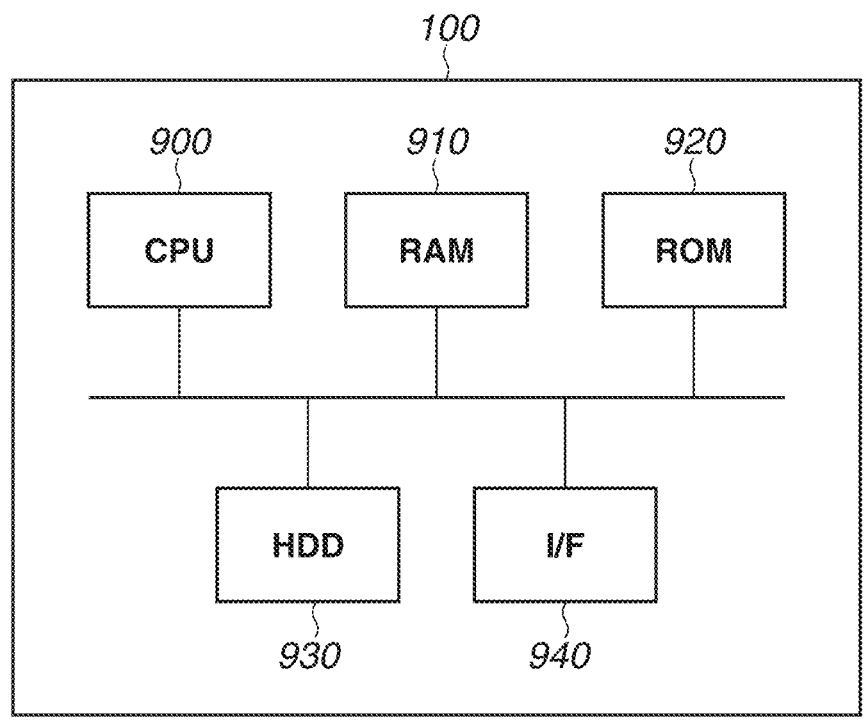
FIG. 9 is a block diagram illustrating a hardware configuration of each apparatus.

A communication unit 200 can be realized by an interface (I/F) 940 described below with reference to FIG. 9, and communicates with the image capturing apparatus 110 and the storage apparatus 120 via the network 140. The communication unit 200, for example, receives the image data captured by the image capturing apparatus 110, and transmits a control command to control the image capturing apparatus 110 to the image capturing apparatus 110. The control command includes, for example, a command to instruct the image capturing apparatus 110 to capture an image.

A storage unit 201 can be realized by a random access memory (RAM) 910, and/or a hard disk drive (HDD) 930, and the like described below with reference to FIG. 9. The storage unit 201 stores information and data regarding generation processing performed by the image processing apparatus 100. The storage unit 201 stores, for example, information about a position of a moving object detected in the captured image.

A display control unit 202 causes the display 130 to display, for example, the captured image captured by the image capturing apparatus 110, a setting screen regarding generation processing according to the present exemplary embodiment, and an output image generated by the generation processing. The setting screen and the output image to be displayed on the display 130 by the display control unit 202 are described in detail below.

An operation reception unit 203 receives an operation performed by a user via an input device (not illustrated) such as a keyboard and a mouse.

A detection unit 204 detects a moving object included in the captured image. The detection unit 204 detects the moving object using a background difference method, which compares the captured image received by the communication unit 200 with a background image. The background image is an image that does not include a specific object (e.g., a person in the present exemplary embodiment) as a target of which privacy is to be protected (e.g., a concealed target).

The detection unit 204 generates, for example, a binary image in which a foreground region indicating a differential region with respect to the background image has a value "1", and the other region has a value "0". In this case, the detection unit 204 can generate a binary image by calculating, for example, a difference value between each pixels in the background image and the captured image. The detection unit 204 sets "1", which indicates the foreground region, to a pixel of which the calculated difference value is a threshold value or greater. The detection unit 204 sets "0" to a pixel of which the calculated difference value is less than the threshold value. As described above, the detection unit 204 regards the specified foreground region as the moving object. The moving object to be detected by the detection unit 204 includes a stationary foreground region specified by the background difference method. The detection unit 204 may specify the foreground region using not only the background difference method but also another method. For example, the detection unit 204 can detect the moving object by performing in-frame differential processing between a previous frame and a present frame.

An extraction unit 205 extracts an edge from the captured image. The extraction unit 205 according to the present exemplary embodiment extracts an edge from a region corresponding to the moving object detected by the detection unit 204 in the captured image. Specifically, the extraction unit 205, for example, calculates differences of luminance and brightness between pixels next to each other in the region corresponding to the moving object in the captured image, and extracts the pixel having a higher luminance (or brightness) value as the edge in a case where the calculated luminance (or brightness) exceeds a threshold value. The extraction unit 205 may extract the edge from an entire captured image or from a region set in advance in the captured image. A known technique can be used as a method for detecting an edge from a captured image. Known techniques include a method using a Sobel filter and a Laplacian filter, and a Canny method.

A determination unit 206 determines whether to superimpose the edge on the region corresponding to the moving object in the background image, which is superimposed with the silhouette image obtained by abstracting the region of the moving object based on the position of the moving object included in the captured image. In a case where the moving object detected by the detection unit 204 is located above a predetermined position in the captured image, the determination unit 206 according to the present exemplary embodiment determines to superimpose the edge on the region corresponding to the moving object in the background image. The determination unit 206 may obtain a distance between the moving object included in the captured image and the image capturing apparatus 110, and determine to superimpose the edge on the region corresponding to the moving object in the background image, in a case where the obtained distance is a threshold value or greater. In this regard, the determination unit 206 determines not to superimpose the edge on the region corresponding to the moving object in the background image, in a case where the distance between the moving object included in the captured image and the image capturing apparatus 110 is less than the threshold value. Processing by the determination unit 206 is described in detail below.

A generation unit 207 generates a silhouette image by abstracting a region of the moving object detected by the detection unit 204. The silhouette image is an image which is abstracted to protect privacy of an object (e.g., an image which is processed so that an individual cannot be identified). The generation unit 207 generates the silhouette image by, for example, filling a region of the moving object in the image with specific color (e.g., blue, and red) or applying mosaic to the region of the moving object. A silhouette image may be an image which is processed so that an individual cannot be identified. The generation method of the silhouette image is not limited to the above-described method.

The generation unit 207 generates an output image in which the silhouette image is superimposed on the region corresponding to the moving object in the background image, and in which the edge extracted by the extraction unit 205 is superimposed on the region in the background image that is determined to be superimposed with the edge by the determination unit 206. The output image generated by the generation unit 207 is displayed on the display 130 by the display control unit 202. The output image generated by the generation unit 207 may not only be displayed on a display device such as the display 130 but also be stored in the storage unit 201 and be distributed to an external apparatus such as the storage apparatus 120.

According to the present exemplary embodiment, the background image to be used in the background difference method by the detection unit 204 may be different from the background image on which the silhouette image is superimposed. For example, the background image to be used in the background difference method by the detection unit 204 may be an image generated based on the captured images of most recent five frames, and the background image on which the silhouette image is superimposed may be an image set by a user in advance.

Figure 3:
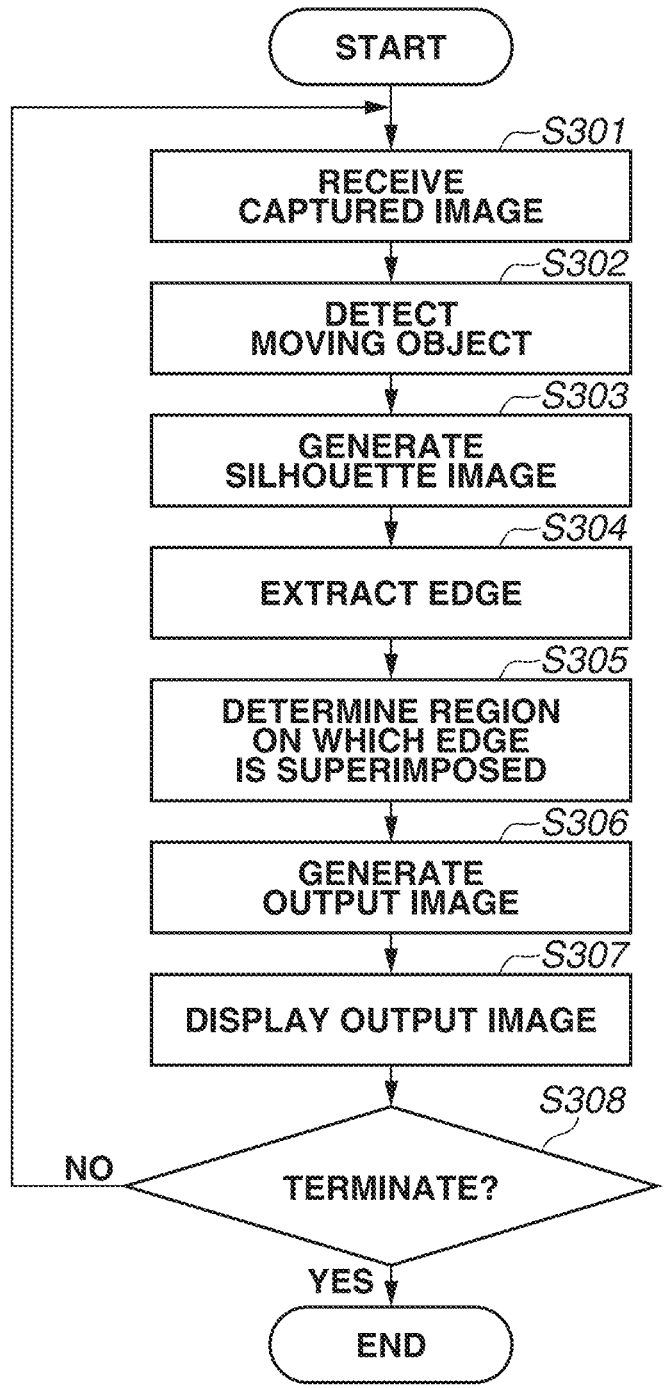
FIG. 3 is a flowchart illustrating a processing flow for generating an output image.

Next, image processing by the image processing apparatus 100 according to the present exemplary embodiment is described in more detail with reference to FIG. 3 and FIGS. 4A to 4E. FIG. 3 is a flowchart illustrating a flow of generation processing for generating an output image by the image processing apparatus 100 according to the present exemplary embodiment. FIGS. 4A to 4E illustrate the generation processing for generating an output image by the image processing apparatus 100 according to the present exemplary embodiment. The processing in the flowchart illustrated in FIG. 3 is executed, and thus an image is generated in which the silhouette image is superimposed on the background image and in which the edge extracted by the extraction unit 205 is superimposed on the region in the background image, which is determined to be superimposed with the edge by the determination unit 206.

The processing in the flowchart illustrated in FIG. 3 is started or ended based on an operation by a user. The processing of the flowchart illustrated in FIG. 3 is executed by each function block illustrated in FIG. 2, which is realized by the CPU 900 included in the image processing apparatus 100 executing a computer program stored in the ROM 920 included in the image processing apparatus 100.

Figure 4A:
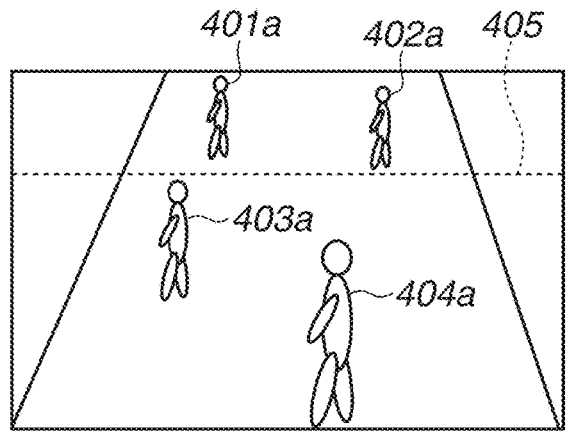
FIGS. 4A to 4E illustrate processing for generating an output image.

In step S301 illustrated in FIG. 3, the communication unit 200 receives the captured image captured by the image capturing apparatus 110. FIG. 4A illustrates an example of the captured image received by the communication unit 200 in step S301. As illustrated in FIG. 4A, the captured image received by the communication unit 200 includes four persons 401a to 404a.

Figure 4B:
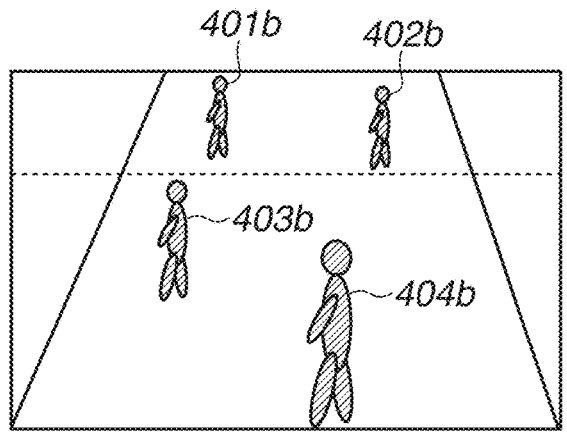

In step S302, the detection unit 204 detects the moving object by comparing the captured image received by the communication unit 200 and the background image. Specifically, the detection unit 204 calculates a difference value between luminance of each pixel in the captured image and luminance of each pixel in the background image, and detects the pixel of which the calculated difference value is a threshold value or greater as the moving object. FIG. 4B illustrates moving objects detected from the captured image. Moving object regions 401b to 404b illustrated in FIG. 4B are regions of the moving objects detected by the detection unit 204.

Figure 4C:
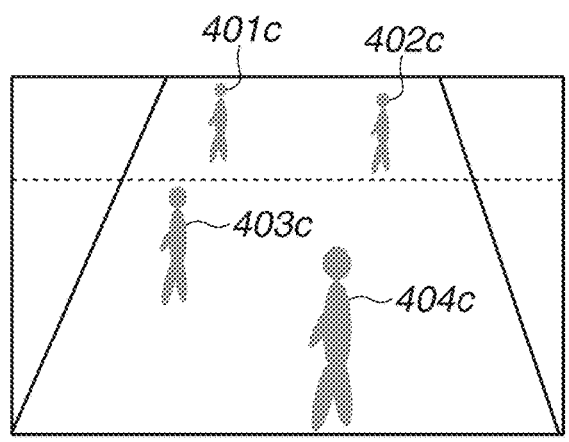
Figure 4D:
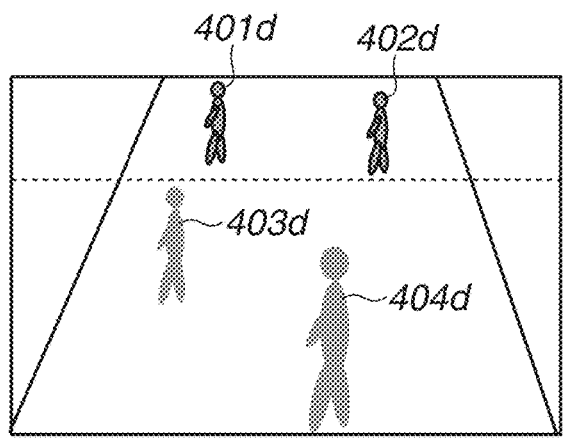
Figure 4E:
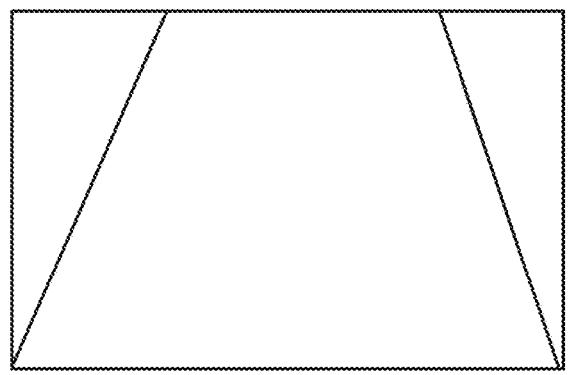

The background image to be used by the detection unit 204 for detecting the moving object is generated by the generation unit 207. For example, the generation unit 207 generates the background image by using captured images of most recent five frames which have been captured before a currently focused latest captured image, and by calculating an average value of each pixel value in the captured images of the most recent five frames. The background image to be generated by the generation unit 207 may be the one registered in advance. A captured image illustrated in FIG. 4E is an example of the background image to be generated by the generation unit 207.

In step S303, the generation unit 207 generates the silhouette image by abstracting the region of the moving object detected by the detection unit 204. Silhouette images 401c to 404c illustrated in FIG. 4C are images generated by performing abstracting processing (e.g., processing the image so that an individual cannot be identified) by the generation unit 207 on the moving object regions 401b to 404b detected by the detection unit 204. The generation unit 207 according to the present exemplary embodiment generates the silhouette images 401c to 404c by filling the respective moving object regions 401b to 404b with single color.

In step S304, the extraction unit 205 extracts an edge from the captured image. The extraction unit 205 according to the present exemplary embodiment extracts the edge from the region corresponding to the moving object detected by the detection unit 204 in the captured image. Specifically, the extraction unit 205 extracts the edge from a region surrounding the moving object region and having an area larger than the moving object region for each of the moving object regions 401b to 404b detected by the detection unit 204 in the captured image. The extraction unit 205 according to the present exemplary embodiment extracts the edge from the region corresponding to the moving object. However, the extraction unit 205 may extract the edge from an entire image.

In step S305, the determination unit 206 determines whether to superimpose the edge extracted by the extraction unit 205 on the region corresponding to the moving object in the background image based on the position of the moving object included in the captured image. In a case where the moving object detected by the detection unit 204 is located above the predetermined position in the captured image, the determination unit 206 according to the present exemplary embodiment determines the region corresponding to the moving object in the background image as the region on which the edge is superimposed. On the other hand, in a case where the moving object detected by the detection unit 204 is located below the predetermined position in the captured image, the determination unit 206 determines the region corresponding to the moving object in the background image as the region on which the edge is not superimposed.

In the examples illustrated in FIGS. 4A to 4E, the determination unit 206 determines the region which is in the background image and corresponds to the moving object region located above a line 405 as the predetermined position in the captured image as the region on which the edge is superimposed among the moving object regions 401b to 404b. In the example illustrated in FIG. 4B, the determination unit 206 determines the moving object regions 401b and 402b as the regions in which the edge is superimposed on the background image. In this regard, the determination unit 206 compares a position of the center of gravity of each of the moving object regions 401b to 404b with the line 405, and determines the moving object region of which the position of the center of gravity is located above the line 405 as the region in which the edge is superimposed on the background image. In a case where a moving object region overlaps with the line 405, the determination unit 206 may perform the following processing. The determination unit 206 may determine a region above the line 405 in the moving object region as the region in which the edge is superimposed on the background image, and a region below the line 405 in the moving object region as the region in which the edge is not superimposed on the background image.

In step S306, the generation unit 207 generates an output image in which the generated silhouette image is superimposed on the background image. In the output image, the edge extracted by the extraction unit 205 is superimposed on the region in the background image which is determined to be superimposed with the edge by the determination unit 206. An image illustrated in FIG. 4D is an example of the output image generated by the generation unit 207. As illustrated in FIG. 4D, the generation unit 207 generates the output image in which the silhouette images 401c to 404c are superimposed on the background image. In the output image, the edge is superimposed on the moving object regions 401b and 402b which are determined to be superimposed with the edge by the determination unit 206. As indicated by a silhouette image 401d of the output image illustrated in FIG. 4D, the output image is generated in which the silhouette image 401c is superimposed on the background image. In the output image, the edge extracted from the moving object region 401b in the captured image is superimposed on the background image. As indicated by the silhouette image 401d, the output image is generated in which the edge extracted from the moving object region 401b is superimposed on the silhouette image 401c. Similarly, as indicated by a silhouette image 402d, the output image is generated in which the silhouette image 402c is superimposed on the background image. In the output image, the edge extracted from the moving object region 402b in the captured image is superimposed on the background image.

In step S307, the display control unit 202 causes the display 130 to display the output image generated by the generation unit 207 in step S306.

In step S308, in a case where termination is instructed by a user (YES in step S308), the processing ends. In a case where termination is not instructed (NO in step S308), the processing returns to step S301, and the communication unit 200 obtains an image in a next frame.

According to the present exemplary embodiment, it is assumed that a person on a front side appears large in a captured image, and a person on a far side appears small in the captured image. Thus, a person captured in the region above the line 405 as the predetermined position in the captured image (i.e., the region more distant from the image capturing apparatus 110) appears relatively small in the captured image. Accordingly, identifiability which is a degree of capability of identifying an individual is low even if the edge is superimposed. Thus, even if the region above the line 405 is crowded with a large number of persons, the captured image can be displayed for a user to easily and intuitively understand how many persons are included in the region by superimposing the edges thereon while protecting privacy of each person.

On the other hand, a person captured in the region below the line 405 as the predetermined position in the captured image (i.e., the region closer to the image capturing apparatus 110) appears relatively large in the captured image. Accordingly, the identifiability which is the degree of capability of identifying an individual is sometimes high if the edge is superimposed. Thus, the edge is not superimposed in the region below the line 405 to protect each person's privacy. In the region below the line 405, even the silhouette image appears in a relatively large size. Thus, even if the captured image is crowded with persons, a user can intuitively understand how many persons are included in the image without superimposing the edge. As described above, the image processing executed by the image processing apparatus 100 according to the present exemplary embodiment adaptively controls whether to superimpose an edge depending on a position of a detected moving object. The control enables a user to easily understand how many persons are included in an image even if the image includes many persons while protecting privacy of the person appearing in the image.

The determination unit 206 included in the image processing apparatus 100 according to the present exemplary embodiment determines the region in which the edge extracted by the extraction unit 205 is superimposed on the background image from the entire image region based on the position of the moving object included in the image. However, how to determine the region is not limited to the above-described processing. For example, the determination unit 206 may determine the region in which the edge extracted by the extraction unit 205 is superimposed on the background image from a region specified by a user in the entire image region based on the position of the moving object included in the image.

Figure 5:
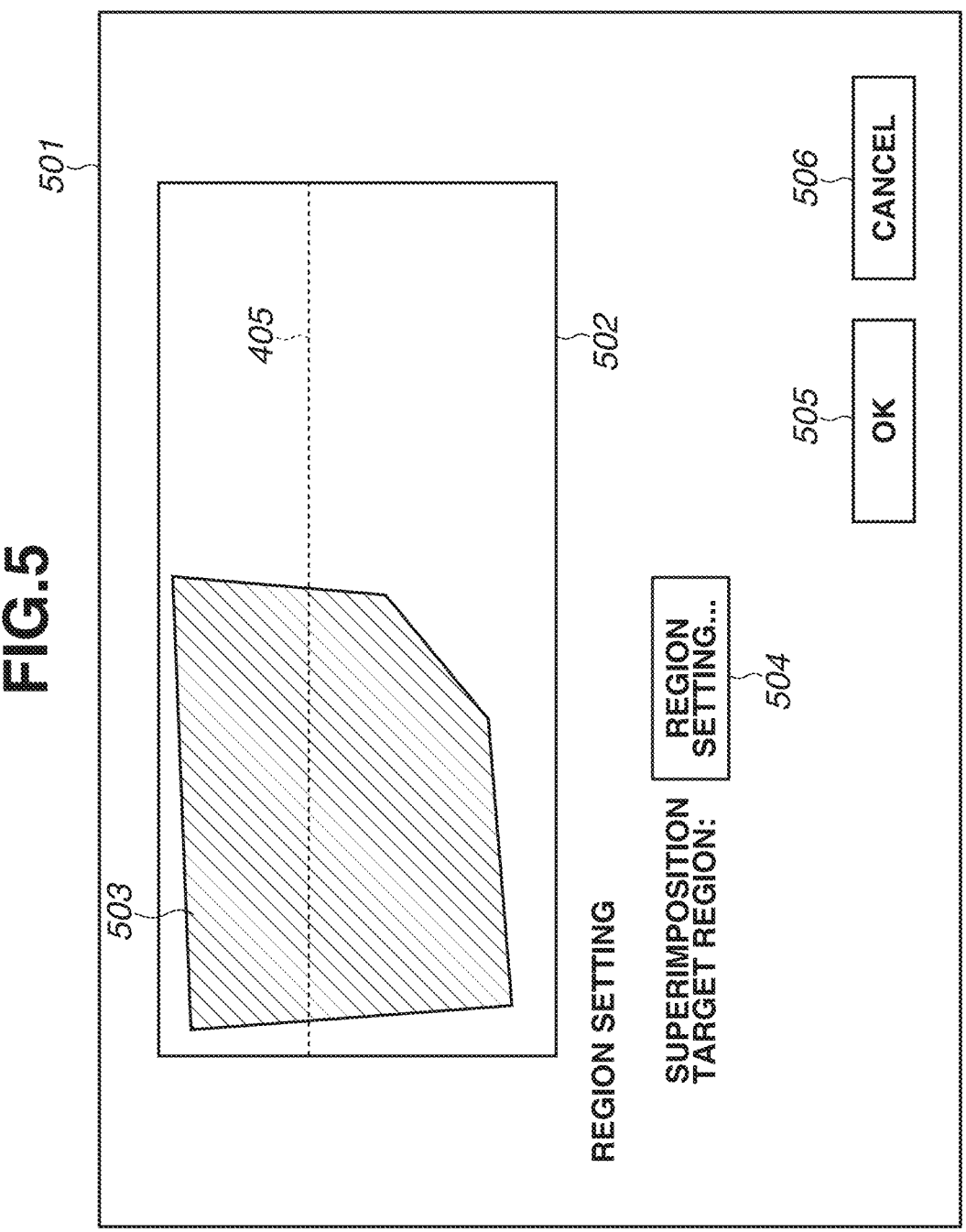
FIG. 5 illustrates a setting screen.

Processing by the determination unit 206 is described with reference to FIG. 5. The processing is used for determining the region in which the edge extracted by the extraction unit 205 is superimposed on the background image from a region specified by a user in the entire image region based on the position of the moving object included in the captured image. A setting screen 501 illustrated in FIG. 5 is an example of a screen displayed on the display 130 by the display control unit 202. A captured image 502 included in the setting screen 501 is an image captured by the image capturing apparatus 110.

A target region 503 represents a region to be a target on which an edge is superimposed. A user can set the target region 503 by pressing a setting button 504, displaying the region in the captured image 502, and adjusting a size and a position of the target region by dragging a mouse and the like. The line 405 as a criterion of whether to superimpose the edge on the background image which is described with reference to FIGS. 4A to 4E may be set by a user as illustrated in FIG. 5.

When a user finally presses an OK button 505, information set on the setting screen 501 is stored, and the setting screen 501 is closed. When the user presses a cancel button 506, information set on the setting screen 501 is not stored, and the setting screen 501 is closed.

The determination unit 206 executes the following processing, in a case where the target region 503 is set on the setting screen 501 illustrated in FIG. 5 as described above. The determination unit 206 determines the region in which the edge extracted by the extraction unit 205 is superimposed on the background image, based on the position of the moving object included in the image and the information about the set target region 503. For example, even if the detected moving object in the image is located above the line 405, the determination unit 206 does not determine the region other than the target region 503 as a superimposition region. In other words, the determination unit 206 according to the present exemplary embodiment determines the region of the moving object which is located above the line 405 and included in the target region 503 as the superimposition region.

The determination unit 206 according to the present exemplary embodiment determines whether to superimpose the edge on the region corresponding to the moving object in the background image based on the position of the moving object included in the captured image. However, the determination unit 206 may perform following processing. The determination unit 206 obtains information about a focal length which is a parameter related to a depth of field from the captured image, and determines a region in which blur occurs in the captured image based on the obtained information about the focal length. Alternatively, the determination unit 206 determines a region in which blur occurs in the captured image based on a length and a density of the edge extracted from the captured image. The determination unit 206 superimposes the edge extracted by the extraction unit 205 from the region in which blur occurs in the image on the background image. On the other hand, the determination unit 206 does not superimpose the edge extracted by the extraction unit 205 from a region in which blur does not occur in the image on the background image. This method is based on an idea that a degree of blur changes according to a depth of field depending on a position in the image, and that identifiability is high in a region including less blur. Thus, the edge is not superimposed in the region.

According to a technique that recognizes a face included in a captured image and does not superimpose an edge extracted from a face having a size of a certain threshold value or lager on a background image, an edge of a face captured relatively large may be superimposed on the background image, in a case where a face cannot be appropriately recognized from a captured image. Accordingly, privacy of a person appearing in the image cannot be appropriately protected in some cases. However, the image processing apparatus 100 according to the present exemplary embodiment determines a superimposition region on which an edge is superimposed according to a position of a detected moving object, and adaptively controls whether to superimpose the edge. Accordingly, the image processing apparatus 100 enables a user to easily understand how many persons are included in an image even many persons are included in the image while protecting privacy of a person appearing in the image.

Figure 6:
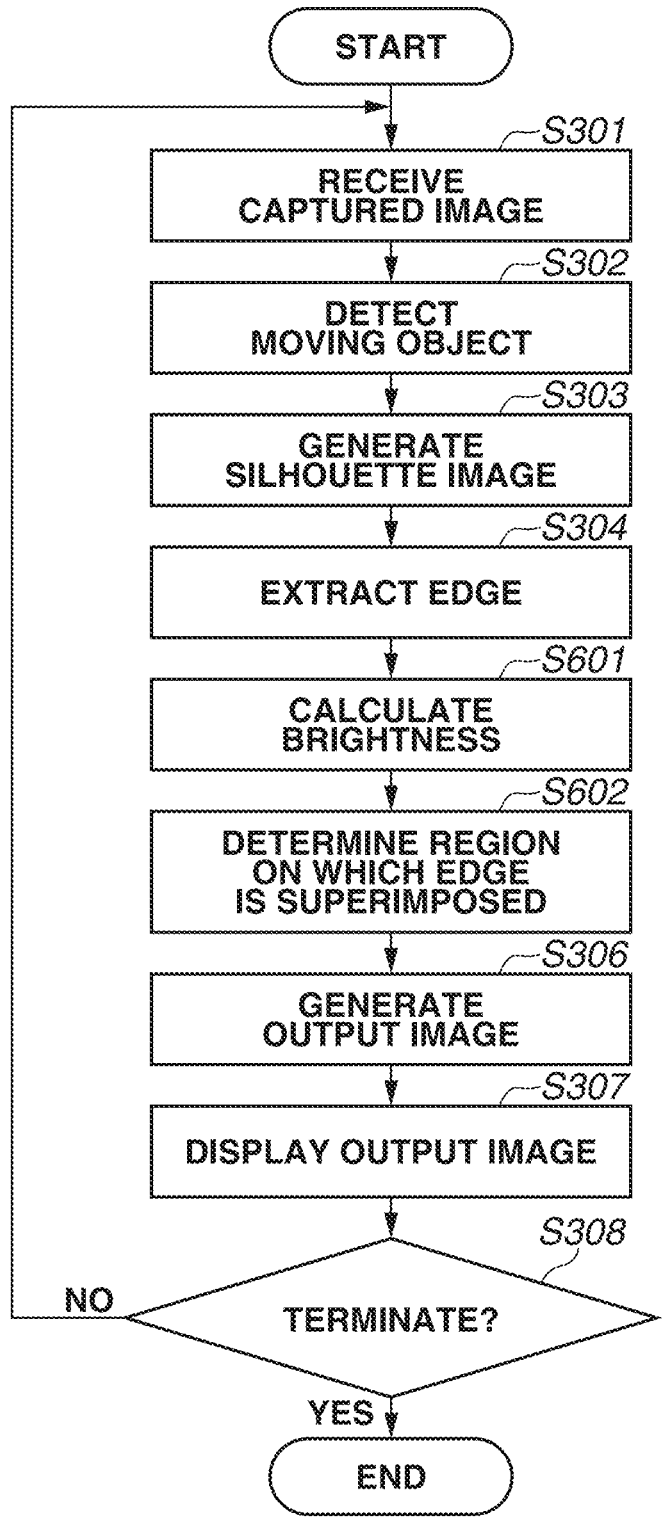
FIG. 6 is a flowchart illustrating a processing flow for generating an output image.

An image processing apparatus 100 according to a second exemplary embodiment determines a region in which an edge is superimposed on a background image based on brightness of each divided region obtained by dividing an image into a plurality of regions. Image processing by the image processing apparatus 100 according to the present exemplary embodiment is described below with reference to FIGS. 6, 7A, and 7B. Portions different from the first exemplary embodiment are mainly described below. Components and processing similar to those according to the first exemplary embodiment are denoted by the same reference numerals, and duplicated descriptions are omitted. FIG. 6 is a flowchart illustrating a flow of generation processing performed by the image processing apparatus 100 according to the present exemplary embodiment. By executing the flow of the generation processing illustrated in FIG. 6, an output image in which a silhouette image and an edge are superimposed on a background image can be generated and displayed based on brightness of each divided region obtained by dividing an image into a plurality of regions.

The processing in the flowchart illustrated in FIG. 6 starts or ends according to an operation by a user. The processing in the flowchart illustrated in FIG. 6 is executed by each function block illustrated in FIG. 2 which is realized by the CPU 900 in the image processing apparatus 100 executing a computer program stored in the ROM 920 in the image processing apparatus 100.

Figure 7A:
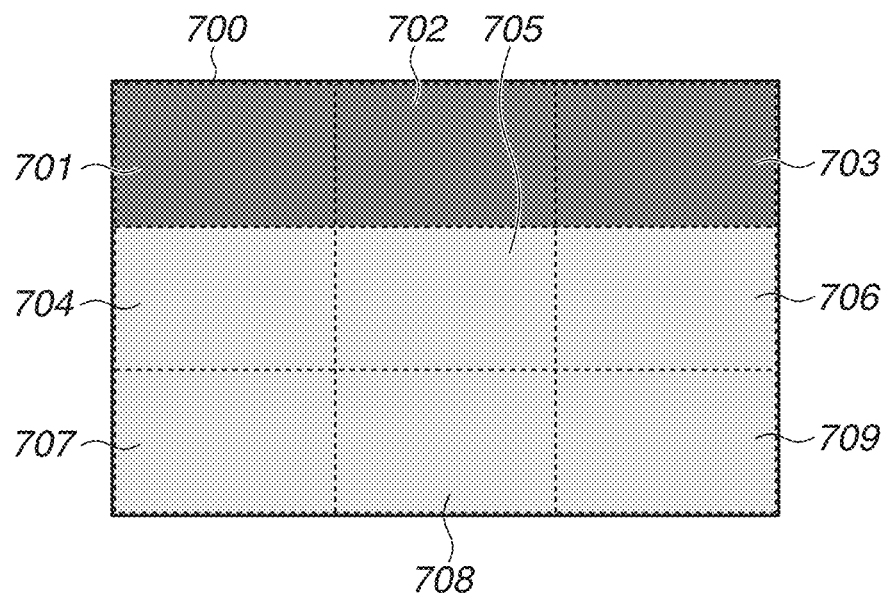
FIGS. 7A and 7B illustrate processing for generating an output image.
Figure 7B:
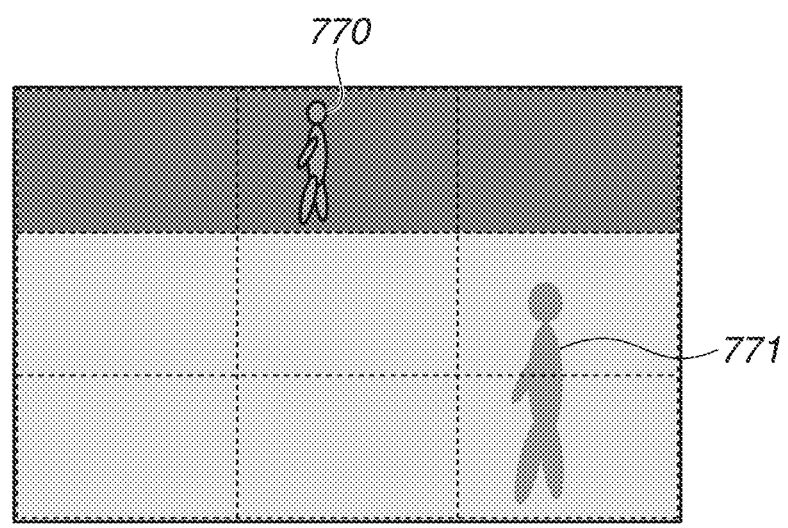

Processing in steps S301 to S304 is similar to that according to the first exemplary embodiment, and thus the descriptions thereof are omitted. In step S601, the determination unit 206 determines the region in which the edge is superimposed on the background image based on brightness of each divided region obtained by dividing the captured image into a plurality of regions. As illustrated in FIG. 7A, divided regions 701 to 709 are set with respect to a captured image 700. The determination unit 206 calculates brightness of each of the divided regions 701 to 709. Specifically, the determination unit 206 calculates, for example, an average value of luminance of pixels in each divided region, and determines the brightness of each divided region. The determination unit 206 may calculate the brightness of each divided region by calculating an average value of brightness of pixels in each divided region.

In step S602, the determination unit 206 determines the region of the moving object detected in the divided region of which brightness satisfies a predetermined condition in the plurality of divided regions as the region in which the edge is superimposed on the background image. Specifically, the determination unit 206 determines, for example, the region of the moving object detected in the divided region of which an average value of luminance exceeds a threshold value as the region in which the edge is superimposed on the background image. Processing in steps S306 and S307 is similar to that according to the first exemplary embodiment, and thus the descriptions thereof are omitted.

The determination unit 206 according to the present exemplary embodiment determines the region of the moving object detected in the divided region of which brightness satisfies the predetermined condition in the plurality of divided regions as the region in which the edge is superimposed on the background image. However, how to determine the region is not limited to the above-described method. For example, the determination unit 206 may determine the region of the detected moving object as the region in which the edge is superimposed on the background image in a case where brightness of the entire captured image satisfies the predetermined condition. In this regard, the determination unit 206 determines the region of the detected moving object as the region in which the edge is superimposed on the background image, in a case where an average value of luminance (or brightness) of each pixel in the entire captured image exceeds a threshold value.

Figure 8:
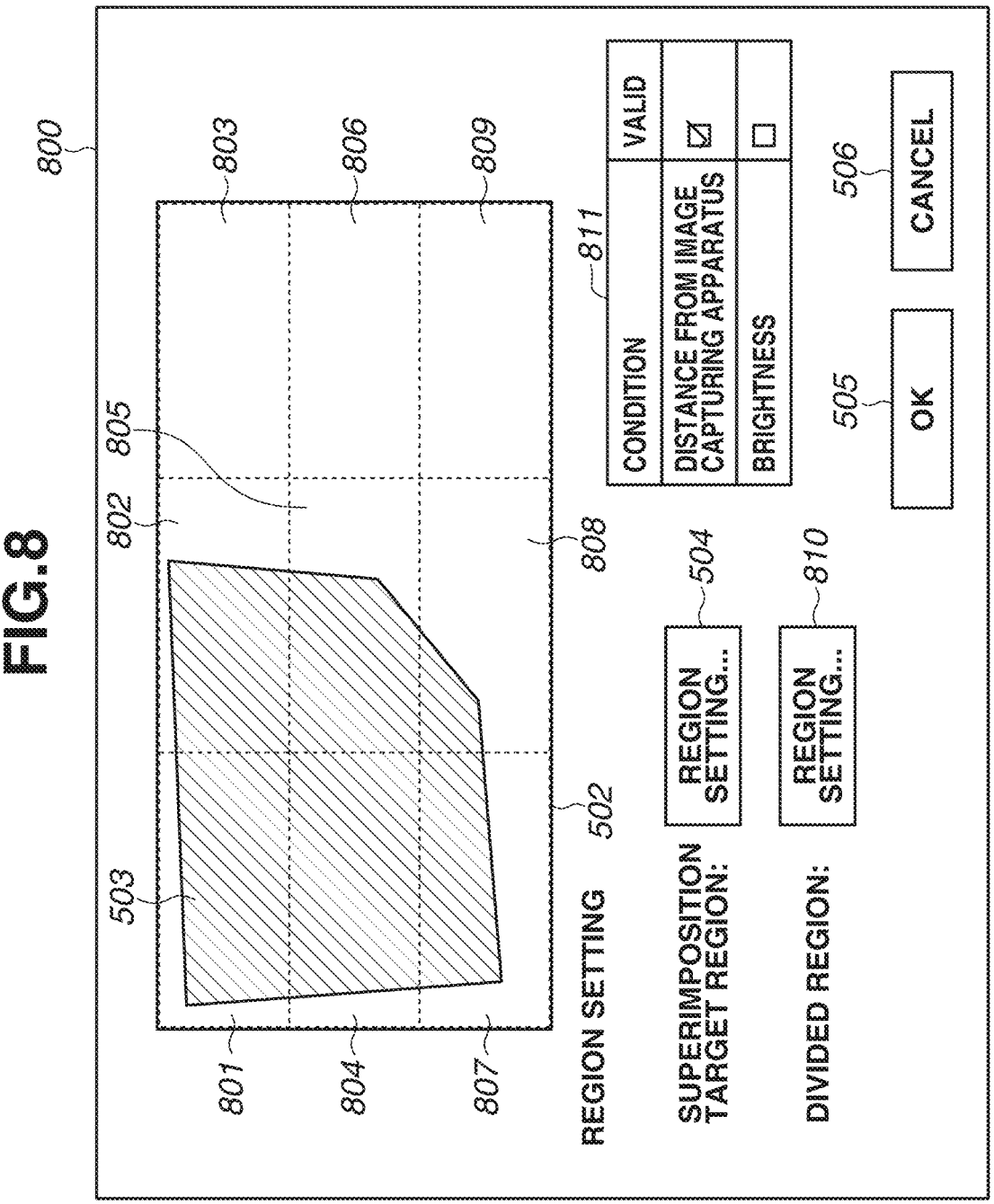
FIG. 8 illustrates a setting screen.

A user interface used for a setting regarding processing for generating an output image according to the present exemplary embodiment is described with reference to a setting screen 800 illustrated in FIG. 8. The setting screen 800 illustrated in FIG. 8 is an example of a screen displayed on the display 130 by the display control unit 202. In descriptions of the image 502, the target region 503, the setting button 504, the OK button 505, and the cancel button 506 are similar to those according to the first exemplary embodiment, and thus the descriptions thereof are omitted.

Divided regions 801 to 809 represent regions in which brightness is determined. A user can set each of the divided regions 801 to 809 with respect to the image 502 by pressing a setting button 810 by clicking of the mouse and the like. For example, a user inputs the number of the divided regions on an input screen (not illustrated) displayed after pressing of the setting button 810. And thus the divided regions based on the number input by the user are displayed on the image 502 in the setting screen 800.

It may also be configured that a user can select whether to generate an output image by the processing according to the first exemplary embodiment or by the processing according to the second exemplary embodiment by inputting a check box in a condition table 811 using the mouse and the like.

As described above, the determination unit 206 in the image processing apparatus 100 according to the present exemplary embodiment determines whether to superimpose an edge on a region corresponding to a moving object in a background image on which a silhouette image obtained by abstracting a region of the moving object is superimposed based on brightness of a captured image. Further, the image processing apparatus 100 generates an image in which the silhouette image is superimposed on the background image, and an edge extracted by the extraction unit 205 is superimposed on a region in the background image determined by the determination unit 206 to be superimposed with the edge. Accordingly, privacy of a person appearing in a captured image can be appropriately protected.

Next, a hardware configuration of the image processing apparatus 100 for realizing each function of each of the exemplary embodiments is described with reference to FIG. 9. The hardware configuration of the image processing apparatus 100 is described below. The storage apparatus 120 and the image capturing apparatus 110 include similar hardware configurations.

The image capturing apparatus 110 according to the present exemplary embodiment includes the CPU 900, the RAM 910, the ROM 920, the HDD 930, and the I/F 940.

The CPU 900 comprehensively controls the image processing apparatus 100. The RAM 910 temporarily stores a computer program executed by the CPU 900. The RAM 910 provides a work area used by the CPU 900 for executing processing. The RAM 910 functions as, for example, a frame memory and a buffer memory.

The ROM 920 stores, for example, a program for the CPU 900 to control the image processing apparatus 100. The HDD 930 is a storage device for storing, for example, image data.

The I/F 940 communicates with an external apparatus according to Transmission Control Protocol/Internet Protocol (TCP/NP) and a HyperText Transfer Protocol (HTTP) via the network 140.

According to the above-described exemplary embodiments, the CPU 900 executes processing. However, at least a part of the processing by the CPU 900 may be executed by dedicated hardware. For example, processing for displaying a graphical user interface (GUI) and image data on the display 130 may be executed by a graphics processing unit (GPU). Further, processing for reading a program code from the ROM 920 and loading the program code in the RAM 910 may be executed by a direct memory access (DMA) functioning as a transfer device.

The present disclosure can be realized by processing executed by one or more processors reading a program for realizing one or more functions of the above-described exemplary embodiments. The program may be supplied to a system or an apparatus including a processor via a network or a storage medium. Further, the present disclosure can be realized by a circuit (e.g., an application specific integrated circuit (ASIC)) for realizing one or more functions of the above-described exemplary embodiments. Each unit in the image capturing apparatus 110 may be realized by the hardware illustrated in FIG. 9 or can be realized by software.

One or more functions of the image processing apparatus 100 according to each of the exemplary embodiments may be included in the image capturing apparatus 110. For example, the detection unit 204, the extraction unit 205, the determination unit 206, and the generation unit 207 in the image processing apparatus 100 illustrated in FIG. 2 may be included in the image capturing apparatus 110. In this case, the image capturing apparatus 110 transmits an output image generated by image processing according to each of the above-described exemplary embodiments to an external apparatus (e.g., the image processing apparatus 100). Further, the output image may be displayed on a display device (e.g., the display 130) connected to the external apparatus.

The present disclosure has been described above with reference to the exemplary embodiments. However, the exemplary embodiments described above are merely examples for implementing the present disclosure, so that the examples should not be construed restrictively limiting the technical scope of the present disclosure. In other words, the present disclosure can be implemented in the various forms without departing from the technical idea and/or the main features thereof. For example, combinations of each of the exemplary embodiments are included in the disclosure of the present specification.

According to each of the above-described exemplary embodiments, privacy of a person appearing in a captured image can be appropriately protected.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-016305, filed Jan. 31, 2019, which is hereby incorporated by reference herein in its entirety.

What is claimed is:

1. An image processing apparatus comprising:
a hardware processor; and
a memory for storing instructions to be executed by the hardware processor, wherein, when the instructions stored in the memory are executed by the hardware processor, the image processing apparatus functions as:
a detection unit configured to detect a moving object from a captured image captured by an image capturing unit;
an extraction unit configured to extract an edge from the captured image;
a determination unit configured to determine, based on a position of the moving object included in the captured image, whether to superimpose the edge on a region corresponding to the moving object in a background image; and
a generation unit configured to generate an output image by superimposing a mask image, for obscuring the moving object, on the region in the background image and superimposing the edge, determined by the determination unit to be superimposed, on the region in the background image,
wherein, in a case where a moving object included in the captured image is located above a predetermined position in the captured image, the determination unit determines a region corresponding to the moving object in the background image as a region on which the edge is superimposed, and in a case where a moving object included in the captured image is located below the predetermined position in the captured image, the determination unit determines a region corresponding to the moving object in the background image as a region on which the edge is not superimposed.

2. The image processing apparatus according to claim 1, wherein, when the instructions stored in the memory are executed by the hardware processor, the image processing apparatus further functions as a reception unit configured to receive designation of a line by a user with respect to a captured image captured by the image capturing unit,
wherein, in a case where the moving object is located above the line in the captured image, the determination unit determines a region of the moving object in the background image as a region on which the edge is superimposed.

3. The image processing apparatus according to claim 1, wherein the extraction unit extracts an edge from the region corresponding to the moving object included in the captured image.

4. The image processing apparatus according to claim 1, wherein the detection unit detects the moving object from the captured image using a background difference method.

5. The image processing apparatus according to claim 1, wherein, when the instructions stored in the memory are executed by the hardware processor, the image processing apparatus further functions as an output unit configured to output an output image generated by the generation unit to a display device.

6. A method for processing an image, the method comprising:
detecting a moving object from a captured image;
extracting an edge from the captured image;
determining, based on a position of the moving object included in the captured image, whether to superimpose the edge on a region corresponding to the moving object in a background image; and
generating an output image by superimposing a mask image, for obscuring the moving object, on the region in the background image and superimposing the edge, determined by the determining to be superimposed, on the region in the background image,
wherein, in a case where a moving object included in the captured image is located above a predetermined position in the captured image, a region corresponding to the moving object in the background image as a region on which the edge is superimposed is determined, and in a case where a moving object included in the captured image is located below the predetermined position in the captured image, a region corresponding to the moving object in the background image as a region on which the edge is not superimposed is determined.

7. A non-transitory computer-readable storage medium storing a program for causing a computer to execute a method for processing an image, the method comprising:
detecting a moving object from a captured image;
extracting an edge from the captured image;
determining, based on a position of the moving object included in the captured image, whether to superimpose the edge on a region corresponding to the moving object in a background image; and
generating an output image by superimposing a mask image, for obscuring the moving object, on the region in the background image and superimposing the edge, determined by the determining to be superimposed, on the region in the background image,
wherein, in a case where a moving object included in the captured image is located above a predetermined position in the captured image, a region corresponding to the moving object in the background image as a region on which the edge is superimposed is determined, and in a case where a moving object included in the captured image is located below the predetermined position in the captured image, a region corresponding to the moving object in the background image as a region on which the edge is not superimposed is determined.

8. An image processing apparatus comprising:
a hardware processor; and
a memory for storing instructions to be executed by the hardware processor, wherein, when the instructions stored in the memory are executed by the hardware processor, the image processing apparatus functions as:
a detection unit configured to detect a moving object from a captured image captured by an image capturing unit;
an extraction unit configured to extract an edge from the captured image;
a determination unit configured to determine, based on a position of the moving object included in the captured image, whether to superimpose the edge on a region corresponding to the moving object in a background image; and a generation unit configured to generate an output image by superimposing a mask image, for obscuring the moving object, on the region in the background image and superimposing the edge, determined by the determination unit to be superimposed, on the region in the background image, wherein, in a case where a distance between a moving object included in the captured image and the image capturing unit exceeds a threshold value, the determination unit determines the region corresponding to the moving object as a region in which the edge is superimposed on the background image.

9. An image processing apparatus comprising:

a hardware processor; and a memory for storing instructions to be executed by the hardware processor, wherein, when the instructions stored in the memory are executed by the hardware processor, the image processing apparatus functions as:

a determination unit configured to determine, based on a position of an object included in a captured image captured by an image capturing unit, whether to superimpose an edge on a region corresponding to the object in a background image; and a generation unit configured to generate an output image by superimposing a mask image, for obscuring the object, on the region in the background image and superimposing the edge, determined by the determination unit to be superimposed, on the region in the background image, wherein, in a case where an object included in the captured image is located above a predetermined position in the captured image, the determination unit determines a region corresponding to the object in the background image as a region on which the edge is superimposed, and in a case where an object included in the captured image is located below the predetermined position in the captured image, the determination unit determines a region corresponding to the object in the background image as a region on which the edge is not superimposed.

10. A method for processing an image, the method comprising:

determining, based on a position of the object included in the captured image, whether to superimpose the edge on a region corresponding to the object in a background image; and generating an output image by superimposing a mask image, for obscuring the object, on the region in the background image and superimposing the edge, determined by the determining to be superimposed, on the region in the background image, wherein, in a case where an object included in the captured image is located above a predetermined position in the captured image, a region corresponding to the object in the background image as a region on which the edge is superimposed is determined, and in a case where an object included in the captured image is located below the predetermined position in the captured image, a region corresponding to the object in the background image as a region on which the edge is not superimposed is determined.

11. A non-transitory computer-readable storage medium storing a program for causing a computer to execute a method for processing an image, the method comprising:

determining, based on a position of the object included in the captured image, whether to superimpose the edge on a region corresponding to the object in a background image; and generating an output image by superimposing a mask image, for obscuring the object, on the region in the background image and superimposing the edge, determined by the determining to be superimposed, on the region in the background image, wherein, in a case where an object included in the captured image is located above a predetermined position in the captured image, a region corresponding to the object in the background image as a region on which the edge is superimposed is determined, and in a case where an object included in the captured image is located below the predetermined position in the captured image, a region corresponding to the object in the background image as a region on which the edge is not superimposed is determined.

* * * * *